United States Patent

Luo et al.

[11] Patent Number: 5,988,892
[45] Date of Patent: Nov. 23, 1999

[54] LOW COST AND EASY TO USE IMPROVED OPTICAL COUPLER

[75] Inventors: Xiaobing Luo; Yu Zheng, both of Sunnyvale, Calif.

[73] Assignee: Oplink Communications, Inc., San Jose, Calif.

[21] Appl. No.: 08/914,689

[22] Filed: Aug. 19, 1997

[51] Int. Cl.$^6$ .................................................. G02B 6/38
[52] U.S. Cl. ................................................. 385/96; 385/99
[58] Field of Search .......................................... 385/95–99

[56] References Cited

U.S. PATENT DOCUMENTS

| | | | |
|---|---|---|---|
| 5,430,821 | 7/1995 | Sasoka et al. | 385/99 |
| 5,450,513 | 9/1995 | Bookbinder et al. | 385/48 |
| 5,694,509 | 12/1997 | Uemura et al. | 385/99 |

*Primary Examiner*—Hung N. Ngo
*Attorney, Agent, or Firm*—Sawyer & Associates

[57] ABSTRACT

A system and method for providing an optical coupler is disclosed. In one aspect, the method and system include a plurality of optical fibers, a first covering, and a second covering. The plurality of optical fibers further include a first end, a second end, a fused portion between the first end and the second end, a first interface between the first end and the fused portion, and a second interface between the second end and fused portion. The first and second coverings enclose substantially all of the first and second interfaces, respectively. In a second aspect, the method and system include a plurality of optical fibers and a covering. The plurality of optical fibers further include a first end, a second end, a fused portion between the first end and the second end, a first interface between the first end and the fused portion, and a second interface between the fused portion and the second end. The covering encloses substantially all of the fused portion, the first interface, and the second interface.

10 Claims, 1 Drawing Sheet

LOW COST AND EASY TO USE IMPROVED OPTICAL COUPLER

FIELD OF THE INVENTION

The present invention relates to a method and system for optical couplers and more particularly to a method and system for providing an optical coupler having improved reliability.

BACKGROUND OF THE INVENTION

Conventional optical couplers are used to combine or divide optical signal, for example an optic signal in a fiber optic cable. Conventional optical couplers are comprised of a plurality of fiber optic cables. Where an optical signal is to be split, the number of cables outputting a signal is greater than the number of cables inputting the signal. Similarly, where an optic signal is to be combined, the number of cables outputting a signal is less than the number of cables inputting the signal.

In order to form a conventional optic coupler, several fiber optic cables are fused together. In order to fuse the fibers, the fibers are typically placed in contact with each other, and heated and placed under tension. As the fibers are heated and drawn, the fibers fuse. To obtain a different number of input fibers than output fibers, a portion of each of a predetermined number of fibers is removed.

An important property of an optical coupler is reliability. For example, the Bellcore standard for fiber optic components provides several standards for optical coupler reliability, including temperature cycling, impact, and vibration standards. The impact, or mechanical shock standard, requires that optical couplers be capable of withstanding eight drops on each of three mutually perpendicular axes from a height of 1.8 meters (six feet). An optical coupler should be able to withstand having this impact test repeated five times. Similarly, optical couplers should pass a vibration test to meet Bellcore vibration standards. The vibration test provides a sinusoidal vibration having a frequency of ten Hertz to two thousand Hertz with an amplitude of 20G (or 1.52 millimeters or 0.0060 inches double amplitude). The frequency is swept from ten Hertz to two thousand Hertz and back within 20 minutes. This sweep cycle is repeated twelve times for in each of three mutually perpendicular directions to complete the test. An optical coupler should meet these standards.

Impact and vibration standards specify the impact and vibrations an optical coupler must withstand before failure. For example, when optical couplers are shipped to consumers, the couplers may be dropped. If the optical coupler cannot withstand the fall, it will fail. Similarly, the vibrations an optical coupler can withstand prior to failure affect its reliability.

Conventional optical couplers are able to withstand only a relatively small impact or small vibrations prior to failure. Thus, the reliability of typical optical couplers is greatly reduced by impacts or vibrations.

Accordingly, what is needed is a system and method for providing an optical coupler with increased resistance to failure due to impacts and vibrations and, therefore, greater reliability. The present invention addresses such a need.

SUMMARY OF THE INVENTION

The present invention provides a method and system for providing an optical coupler. In one aspect, the method and system comprise a plurality of optical fibers, a first covering, and a second covering. The plurality of optical fibers further comprise a first end, a second end, a fused portion between the first end and the second end, a first interface between the first end and the fused portion, and a second interface between the second end and fused portion. The first covering encloses substantially all of the first interface. The second covering encloses substantially all of the second interface. In a second aspect, the method and system comprise a plurality of optical fibers and a covering. The plurality of optical fibers further comprise a first end, a second end, a fused portion between the first end and the second end, a first interface between the first end and the fused portion, and a second interface between the fused portion and the second end. The covering encloses substantially all of the fused portion, the first interface, and the second interface.

According to the system and method disclosed herein, the present invention provide an optical coupler having increased reliability due to decreased sensitivity to impacts and vibrations, thereby increasing overall system performance.

DETAILED DESCRIPTION OF THE INVENTION

The present invention relates to an improvement in optical couplers. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
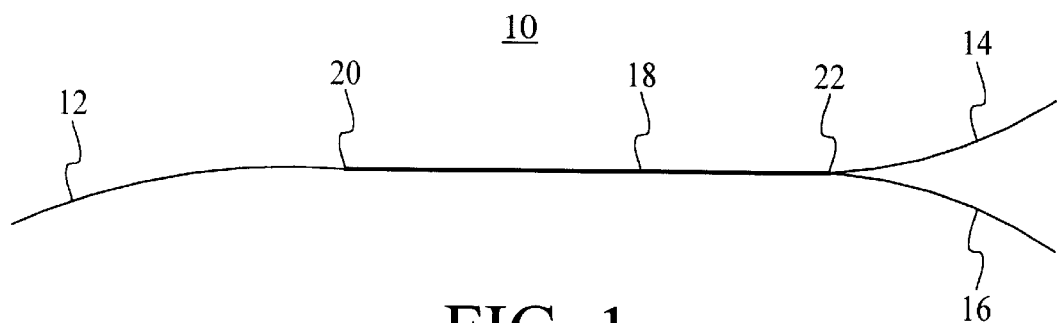
FIG. 1 is a block diagram of a conventional optical coupler.

FIG. 1 is a block diagram of a conventional optical coupler 10 used to combine or divide optical signal. The optical coupler 10 is contains three optical fibers 12, 14, and 16. Where an optical signal is to be split, the signal is input fiber 12 and output through fibers 14 and 16. Similarly, where an optic signal is to be combined, the signals are input to fibers 14 and 16 and output on fiber 12.

In order to form the conventional optic coupler 10, the optic fibers 12, 14, and 16 are fused. In order to fuse the fibers 12, 14, and 16, the fibers 12, 14, and 16 are placed in contact with each other, heated, and drawn. As the fibers 12, 14, and 16 are heated and drawn, the fibers 12 14, and 16 fuse, forming central fused portion 18. A portion of certain fibers are removed, leaving fibers 12, 14, and 16. The interfaces 20 and 22 are at the transitions between fused portion 18 and the unfused portions of the fibers 12, 14, and 16.

An important property of an optical coupler is reliability. Impact and vibration can adversely affect reliability. For example, when optical couplers are shipped to consumers, the couplers may be dropped. If the optical coupler cannot withstand the fall, it will fail. Similarly, the vibrations an optical coupler can withstand prior to failure affect its reliability.

Although the conventional optical coupler 10 shown in FIG. 1 can divide or combine signals, those with ordinary skill in the art will realize that the conventional optical coupler 10 is unable to withstand relatively small impacts or vibrations prior to failure. The interfaces 20 and 22 are brittle. Thus, when dropped or subjected to vibrations, the interfaces 20 and 22 have a marked tendency to break. For example, most conventional optical couplers, such as optical coupler 10, will fail after being dropped from a height of approximately 1.8 meters. Often, this failure is due to a break at one or both of the interfaces 20 and 22. Because the optical coupler 10 fails, reliability is reduced.

The present invention provides for a method and system for providing optical couplers having increased reliability. The present invention will be described in terms of a 1×2 optical coupler manufactured with particular components. However, one of ordinary skill in the art will readily recognize that this method and system will operate effectively for other types of optical couplers and other components.

Figure 2:
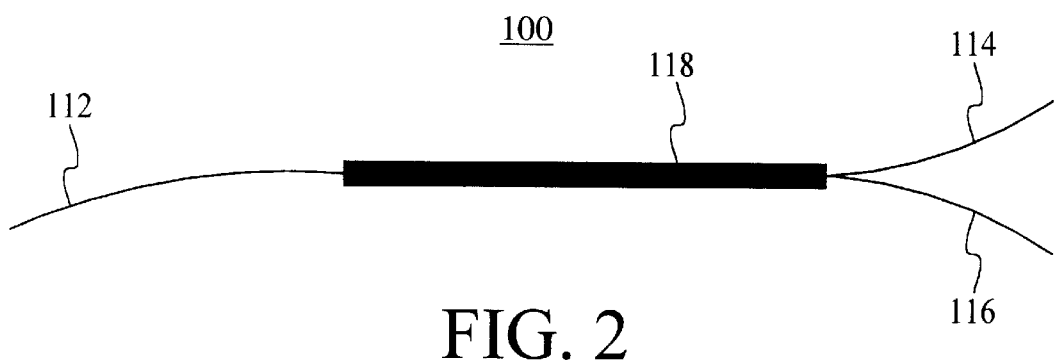
FIG. 2 is a block diagram of one embodiment of an optical coupler in accordance with the method and system.

To more particularly illustrate the method and system in accordance with the present invention, refer now to FIG. 2 depicting a block diagram of one embodiment of an optical coupler 100 in accordance with the method and system. The optical coupler 100 includes optical fibers 112, 114, and 116. Epoxy 118 covers the central portion, including any fused portions and interfaces. Because of the epoxy covering 118, the mechanical strength of the fused portion and interfaces of optical coupler 100 is increased. The optical coupler 100 is less likely to fail under impact or vibrations and, therefore, more reliable.

Although the optical coupler 100 has increased mechanical strength, the epoxy covering 118 also affects the optical properties of the optical coupler 100. For example, prior to formation of the epoxy covering 118, the optical coupler 100 would evenly split a signal input to fiber 112 between fibers 114 and 116. After the epoxy covering 118 is formed, the optical coupler may not longer provide half of the signal to each fiber 114 and 116. Instead, the optical coupler 100 might provide forty-five percent of the output signal to the fiber 114 and fifty-five percent of the output signal to the fiber 116.

Figure 3:
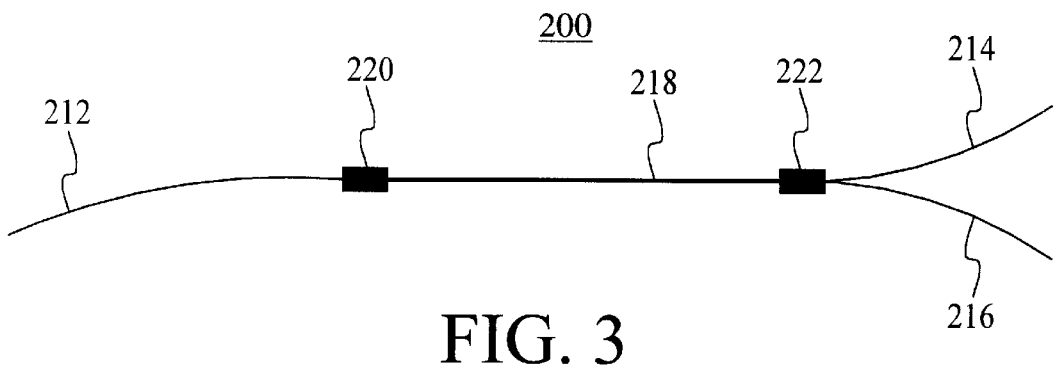
FIG. 3 is a is a block diagram of a preferred embodiment of an optical coupler in accordance with the method and system.

Refer now to FIG. 3 depicting a preferred embodiment of an optical coupler 200 in accordance with the method and system. The optical coupler 200 includes optical fibers 212, 214, and 216. The fused portion 218 is fused due to heating and drawing of the fibers 212, 214 and 216 during formation of the optical coupler 110. Mixed epoxy coverings 220 and 222 cover the interfaces between the fused portion 218 and the unfused portions of fibers 212, 214, and 216.

Because the mixed epoxy coverings 220 and 222 encase the interfaces between the fused portion 218 and the unfused portions of fibers 212, 214, and 216, the mechanical strength of the interfaces is increased. Consequently, the optical coupler 200 is less susceptible to failure due to impacts or vibrations and is capable of meeting the Bellcore impact and vibration standards discussed above. Thus, the optical coupler 200 is more reliable.

To form the mixed epoxy coverings 220 and 222 in a preferred embodiment epoxy is combined with quartz powder. Although quartz powder is used in a preferred embodiment, nothing prevents the use of another material having the requisite properties. Thus, another substance with a low coefficient of thermal expansion or which will increase the density of the epoxy could be used. In a preferred embodiment, the epoxy used is silicon adhesive like Sid 151 made by Master Bond. In a preferred embodiment, the epoxy and quartz powder are mixed in a ratio of epoxy to quartz powder is 10:1 by weight. In addition, the epoxy and quartz powder are mixed until the quartz powder is well distributed throughout the epoxy, making the mixture uniform.

Once the mixed epoxy (the mixture of epoxy and quartz powder) is prepared, the mixed epoxy is applied to the interfaces between the fused portion 218 and the unfused fiber 212, 214, and 216. The mixed epoxy coverings 220 and 222 are then heated to cure the epoxy. In a preferred embodiment, the mixed epoxy coverings 220 and 222 are heated to a temperature of between two hundred and three hundred degrees Celsius for curing.

The quartz powder mixed into the epoxy provides two benefits. First, the coefficient of thermal expansion quartz is low, much lower than the coefficient of thermal expansion of the epoxy. When the quartz powder is mixed throughout the epoxy, the mixed epoxy has a lower coefficient of thermal expansion than the epoxy alone. Consequently, the mixed epoxy coverings 220 and 222 move less when the temperature changes. Thus, the mixed epoxy coverings 220 and 222 are more mechanically sound.

Second, because of the quartz powder, the mixed epoxy has a greater density than the epoxy alone. As a result, when the mixed epoxy is applied to the optical coupler 200, the mixed epoxy does not flow as easily. Because the mixed epoxy does not flow as easily, it will not cover the fused portion 218 of the optical coupler 200. Changes to the fused portion 218 can greatly change the optical properties of the optical coupler 200, as discussed above. Since the mixed epoxy does not flow over the fused portion 218, the optical properties of the optical coupler 200 remain substantially unchanged. As a result, in a preferred embodiment, the method and system provide an optical coupler with increased reliability without changing the properties of the optical coupler.

A method and system has been disclosed for an optical coupler having increased reliability through decreased sensitivity to impact or vibrations. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. An optical coupler comprising:

a plurality of optical fibers, the plurality of optical fibers further comprising a first end, a second end, a fused portion between the first end and the second end, a first interface between the first end and the fused portion, and a second interface between the second end and fused portion;

a first covering enclosing substantially all of the first interface, the first covering including a first mixed epoxy covering, the first mixed epoxy covering further including a mixture of an epoxy having a first coefficient of thermal expansion and a first component having a second coefficient of thermal expansion less than the first coefficient of thermal expansion; and a second covering enclosing substantially all of the second interface.

2. The optical coupler of claim 1 wherein the second covering further comprises:

a second mixed epoxy covering, the second mixed epoxy covering further including mixture of the epoxy and the first component.

3. The optical coupler of claim 1 wherein the mixture of the epoxy and the first component has a density of the mixture of the epoxy and the first component being greater than a density of the epoxy.

4. The optical coupler of claim 1 wherein the first component further comprises quartz powder.

5. The optical coupler of claim 4 wherein the mixture of the epoxy and the first component further comprises a mixture of epoxy and quartz powder in a ten to one ratio, by weight.

6. A method for providing an optical coupler comprising the steps of:

providing a plurality of optical fibers, the plurality of optical fibers further comprising a first end, a second end, a fused portion between the first end and the second end, a first interface between the first end and the fused portion, and a second interface between the fused portion and the second end;

providing a first covering enclosing substantially all of the first interface, the first covering including a first mixed epoxy covering, the first mixed epoxy covering further including a mixture of an epoxy having a first coefficient of thermal expansion and a first component having a second coefficient of thermal expansion less than the first coefficient of thermal expansion; and providing a second covering enclosing substantially all of the second interface.

7. The method of claim 6 wherein the second covering providing step further comprises the step of:

providing a second mixed epoxy covering, the second mixed epoxy covering further including mixture of the epoxy and the first component.

8. The method of claim 6 wherein the mixture of the epoxy and the first component has a density, the density of the mixture of the epoxy and the first component being greater than a density of the epoxy.

9. The method of claim 6 wherein the first component further comprises quartz powder.

10. The method of claim 9 wherein the mixture of the epoxy and the first component further comprises a mixture of epoxy and quartz powder in a ten to one ratio, by weight.

\* \* \* \* \*